(12) United States Patent
Chalmers et al.

(10) Patent No.: US 7,957,478 B2
(45) Date of Patent: Jun. 7, 2011

(54) RADIO SIGNAL GENERATOR

(75) Inventors: Harvey Chalmers, Rockville, MD (US); Robert Michaels, Waterford, MI (US)

(73) Assignee: iBiquity Digital Corporation, Columbia, MD (US)

( * ) Notice: Subject to any disclaimer, the term of this patent is extended or adjusted under 35 U.S.C. 154(b) by 764 days.

(21) Appl. No.: 11/863,943

(22) Filed: Sep. 28, 2007

(65) Prior Publication Data
US 2009/0086833 A1    Apr. 2, 2009

(51) Int. Cl.
*H04K 1/10* (2006.01)
(52) U.S. Cl. ........ 375/260; 375/259; 370/310; 370/319; 455/59
(58) Field of Classification Search .................. 375/260; 455/67.14
See application file for complete search history.

(56) References Cited

U.S. PATENT DOCUMENTS

| | | | |
|---|---|---|---|
| 5,224,119 A | 6/1993 | Barabash et al. | |
| 6,438,173 B1 | 8/2002 | Stantchev | |
| 7,076,228 B1 | 7/2006 | Rilling | |
| 7,133,649 B2 * | 11/2006 | Kanazawa et al. | 455/91 |
| 7,158,564 B1 * | 1/2007 | Kernchen et al. | 375/224 |
| 7,218,094 B2 | 5/2007 | Khandros et al. | |
| 7,254,374 B2 | 8/2007 | Downs | |
| 2002/0122383 A1 * | 9/2002 | Wu et al. | 370/210 |
| 2003/0125065 A1 * | 7/2003 | Barak et al. | 455/522 |
| 2004/0114675 A1 * | 6/2004 | Crawford | 375/149 |
| 2004/0162048 A1 * | 8/2004 | Milbar et al. | 455/266 |
| 2005/0163239 A1 * | 7/2005 | Sakoda et al. | 375/260 |
| 2005/0163240 A1 * | 7/2005 | Sakoda et al. | 375/260 |
| 2005/0163256 A1 * | 7/2005 | Kroeger | 375/300 |
| 2005/0174933 A1 * | 8/2005 | Sakoda et al. | 370/208 |
| 2005/0215213 A1 * | 9/2005 | Toporski | 455/190.1 |
| 2006/0046665 A1 * | 3/2006 | Yang et al. | 455/114.3 |
| 2006/0209941 A1 * | 9/2006 | Kroeger | 375/222 |
| 2007/0165729 A1 * | 7/2007 | Ha et al. | 375/260 |
| 2007/0223610 A1 * | 9/2007 | Jacobsen | 375/260 |
| 2007/0287398 A1 * | 12/2007 | Mino | 455/214 |
| 2008/0045167 A1 * | 2/2008 | Yoshida | 455/131 |
| 2008/0081572 A1 * | 4/2008 | Rofougaran | 455/127.1 |
| 2008/0205569 A1 * | 8/2008 | Kwak | 375/371 |
| 2008/0232480 A1 * | 9/2008 | Tuttle et al. | 375/259 |
| 2008/0279287 A1 * | 11/2008 | Asahina | 375/242 |

(Continued)

FOREIGN PATENT DOCUMENTS

WO    WO0051272 A1    8/2000

OTHER PUBLICATIONS

NOISECOM COM: "DSG9000 HD Radio", [Online], Nov. 13, 2006, XP-002534358, 5 pgs. & XP-002534991, 1 pg.
Rohde & Schwarz, "Software WinIQSIM for Calculating I/O Signals for Modulation Generator R&S AMIQ", Software Manual & Application Manual, [Online], Mar. 1, 2004, XP-002534359, 543 pgs. & XP-002534992, 1 pg.
National Radio Systems Committee, NRSC-5-A, In-band/on-channel Digital Radio Broadcasting Standard, Sep. 2005, 42 pgs.

*Primary Examiner* — Chieh M Fan
*Assistant Examiner* — Santiago Garcia
(74) *Attorney, Agent, or Firm* — Robert P. Lenart, Esq.; Pietragallo Gordon Alfano Bosick & Raspanti, LLP

(57) ABSTRACT

A signal generator includes a memory for storing content information in the form of vectors including in-phase and quadrature elements of an orthogonal frequency division multiplexing waveform, a processor for converting the vectors to a radio frequency signal, and a logic device for controlling the operation of the memory and the processor. The in-phase and quadrature elements represent baseband content of the orthogonal frequency-division multiplexing waveform.

22 Claims, 15 Drawing Sheets

U.S. PATENT DOCUMENTS

2009/0033455 A1* 2/2009 Strat et al. ...................... 340/5.1
2009/0058623 A1* 3/2009 Mino ............................ 340/438
2009/0202012 A1* 8/2009 Garcia et al. .................. 375/260
2009/0245208 A1* 10/2009 Liu et al. ...................... 370/335

* cited by examiner

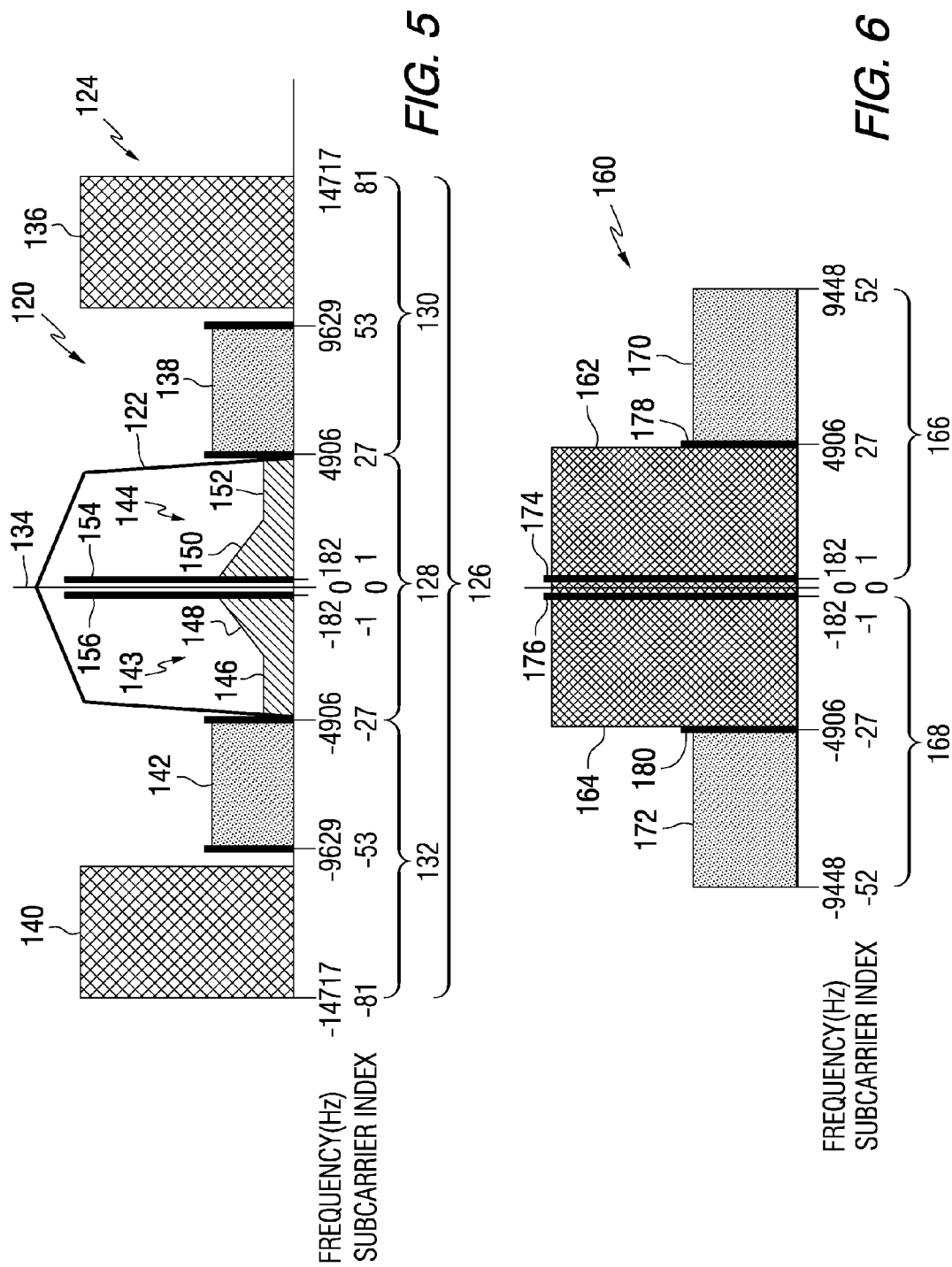

RADIO SIGNAL GENERATOR

FIELD OF THE INVENTION

This invention relates to signal generators and more particularly to signal generators for generating signals compatible with in-band on-channel (IBOC) radio receivers.

BACKGROUND OF THE INVENTION

Digital radio broadcasting technology delivers digital audio and data services to mobile, portable, and fixed receivers. One type of digital radio broadcasting, referred to as in-band on-channel (IBOC) digital audio broadcasting (DAB), uses terrestrial transmitters in the existing medium frequency (MF) and very high frequency (VHF) radio bands. HD Radio™ technology, developed by iBiquity Digital Corporation, is one example of an IBOC implementation for digital radio broadcasting and reception.

IBOC DAB signals can be transmitted in a hybrid format including an analog modulated carrier in combination with a plurality of digitally modulated carriers or in an all-digital format wherein the analog modulated carrier is not used. Using the hybrid mode, broadcasters may continue to transmit analog AM and FM simultaneously with higher-quality and more robust digital signals, allowing themselves and their listeners to convert from analog-to-digital radio while maintaining their current frequency allocations.

One feature of digital transmission systems is the inherent ability to simultaneously transmit both digitized audio and data. Thus the technology also allows for wireless data services from AM and FM radio stations. The broadcast signals can include metadata, such as the artist, song title, or station call letters. Special messages about events, traffic, and weather can also be included. For example, traffic information, weather forecasts, news, and sports scores can all be scrolled across a radio receiver's display while the user listens to a radio station.

IBOC DAB technology can provide digital quality audio, superior to existing analog broadcasting formats. Because each IBOC DAB signal is transmitted within the spectral mask of an existing AM or FM channel allocation, it requires no new spectral allocations. IBOC DAB promotes economy of spectrum while enabling broadcasters to supply digital quality audio to the present base of listeners.

Multicasting, the ability to deliver several programs or data streams over one channel in the AM or FM spectrum, enables stations to broadcast multiple streams of data on separate supplemental or sub-channels of the main frequency. For example, multiple streams of data can include alternative music formats, local traffic, weather, news, and sports. The supplemental channels can be accessed in the same manner as the traditional station frequency using tuning or seeking functions. For example, if the analog modulated signal is centered at 94.1 MHz, the same broadcast in IBOC DAB can include supplemental channels 94.1-1, 94.1-2, and 94.1-3. Highly specialized programming on supplemental channels can be delivered to tightly targeted audiences, creating more opportunities for advertisers to integrate their brand with program content. As used herein, multicasting includes the transmission of one or more programs in a single digital radio broadcasting channel or on a single digital radio broadcasting signal. Multicast content can include a main program service (MPS), supplemental program services (SPS), program service data (PSD), and/or other broadcast data.

The National Radio Systems Committee, a standard-setting organization sponsored by the National Association of Broadcasters and the Consumer Electronics Association, adopted an IBOC standard, designated NRSC-5A, in September 2005. NRSC-5A, the disclosure of which is incorporated herein by reference, sets forth the requirements for broadcasting digital audio and ancillary data over AM and FM broadcast channels. The standard and its reference documents contain detailed explanations of the RF/transmission subsystem and the transport and service multiplex subsystems. Copies of the standard can be obtained from the NRSC at http://www.nrscstandards.org/standards.asp. iBiquity's HD Radio™ technology is an implementation of the NRSC-5A IBOC standard. Further information regarding HD Radio™ technology can be found at www.hdradio.com and www.ibiquity.com.

Other types of digital radio broadcasting systems include satellite systems such as XM Radio, Sirius and WorldSpace, and terrestrial systems such as Digital Radio Mondiale (DRM), Eureka 147 (branded as DAB), DAB Version 2, and FMeXtra. As used herein, the phrase "digital radio broadcasting" encompasses digital audio broadcasting including in-band on-channel broadcasting, as well as other digital terrestrial broadcasting and satellite broadcasting.

SUMMARY OF THE INVENTION

In a first aspect, the invention provides a signal generator including a memory for storing content information in the form of vectors including in-phase and quadrature elements of an orthogonal frequency division multiplexing (OFDM) waveform, a signal processor for converting the signal to a radio frequency (RF) signal, and a control processor for controlling the operation of the memory and the signal processor.

In another aspect, the invention provides a method of demonstrating or testing the operation of a radio receiver. The method includes the steps of using a portable signal generator to produce a radio frequency signal, transmitting the radio frequency signal to a radio receiver, and using the radio receiver to produce an output in response to the radio frequency signal, wherein the portable signal generator includes a memory containing vectors used to produce the radio frequency signal.

In another aspect, the invention provides a signal generator including an input for receiving analog content information, an analog-to-digital converter for converting the analog content information to digital content information, a first processor for converting the digital content information to a plurality of vectors including in-phase and quadrature elements, and a second processor for vectors to produce an orthogonal frequency-division multiplexing signal.

In another aspect, the invention provides a signal generator including a user interface for inputting content information, a first processor for converting the content information to a plurality of vectors including in-phase and quadrature elements of an OFDM waveform, and a second processor for processing the vectors to produce an RF signal.

In another aspect, the invention provides an apparatus including a plurality of signal generators each having a memory for storing content information in the form of vectors including in-phase and quadrature elements and a processor for using the content information to produce a plurality of RF signals, and a combiner for combining the RF signals into a combined signal.

These and other features and advantages will be apparent from a reading of the following detailed description.

BRIEF DESCRIPTION OF THE DRAWINGS

FIG. 5 is a schematic representation of a hybrid AM IBOC DAB waveform.

FIG. 6 is a schematic representation of an all-digital AM IBOC DAB waveform.

DETAILED DESCRIPTION OF THE INVENTION

FIGS. 1-8 and the accompanying description herein provide a general description of an IBOC system, including broadcasting equipment structure and operation, receiver structure and operation, and the structure of IBOC DAB waveforms. FIGS. 9-12 and the accompanying description herein provide a detailed description of the structure and operation of signal generators according to various aspects of the present invention.

IBOC System and Waveforms

Figure 1:
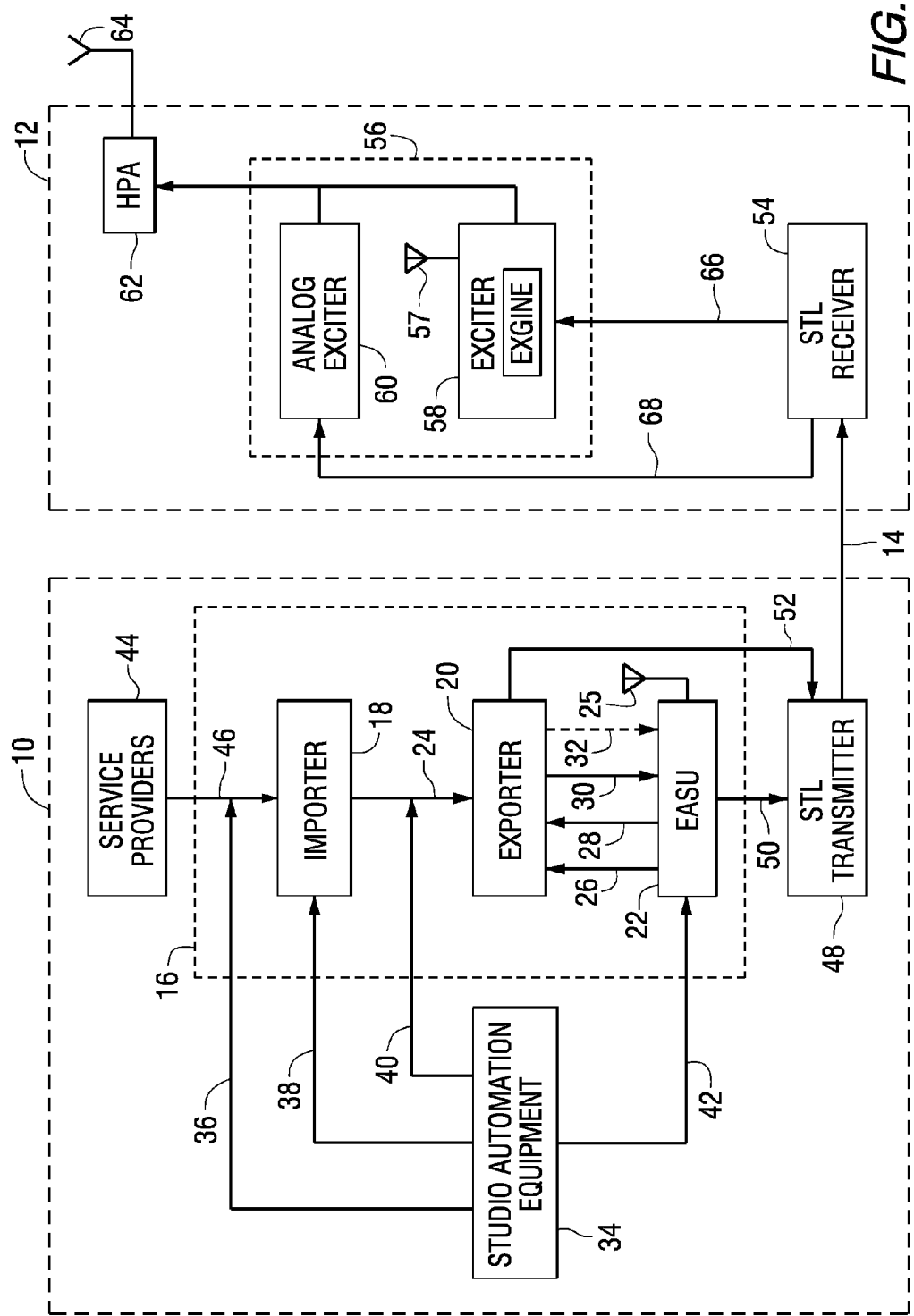
FIG. 1 is a block diagram of a transmitter for use in an in-band on-channel digital radio broadcasting system.

Referring to the drawings, FIG. 1 is a functional block diagram of the relevant components of a studio site 10, an FM transmitter site 12, and a studio transmitter link (STL) 14 that can be used to broadcast an FM IBOC DAB signal. The studio site includes, among other things, studio automation equipment 34, an Ensemble Operations Center (EOC) 16 that includes an importer 18, an exporter 20, an exciter auxiliary service unit (EASU) 22, and an STL transmitter 48. The transmitter site includes an STL receiver 54, a digital exciter 56 that includes an exciter engine (exgine) subsystem 58, and an analog exciter 60. While in FIG. 1 the exporter is resident at a radio station's studio site and the exciter is located at the transmission site, these elements may be co-located at the transmission site.

At the studio site, the studio automation equipment supplies main program service (MPS) audio 42 to the EASU, MPS data 40 to the exporter, supplemental program service (SPS) audio 38 to the importer, and SPS data 36 to the importer. MPS audio serves as the main audio programming source. In hybrid modes, it preserves the existing analog radio programming formats in both the analog and digital transmissions. MPS data, also known as program service data (PSD), includes information such as music title, artist, album name, etc. Supplemental program service can include supplementary audio content as well as program associated data.

The importer contains hardware and software for supplying advanced application services (AAS). A "service" is content that is delivered to users via an IBOC DAB broadcast, and AAS can include any type of data that is not classified as MPS, SPS, or Station Information Service (SIS). SIS provides station information, such as call sign, absolute time, position correlated to GPS, etc. Examples of AAS data include real-time traffic and weather information, navigation map updates or other images, electronic program guides, multimedia programming, other audio services, and other content. The content for AAS can be supplied by service providers 44, which provide service data 46 to the importer via an application program interface (API). The service providers may be a broadcaster located at the studio site or externally sourced third-party providers of services and content. The importer can establish session connections between multiple service providers. The importer encodes and multiplexes service data 46, SPS audio 38, and SPS data 36 to produce exporter link data 24, which is output to the exporter via a data link.

The exporter 20 contains the hardware and software necessary to supply the main program service and SIS for broadcasting. The exporter accepts digital MPS audio 26 over an audio interface and compresses the audio. The exporter also multiplexes MPS data 40, exporter link data 24, and the compressed digital MPS audio to produce exciter link data 52. In addition, the exporter accepts analog MPS audio 28 over its audio interface and applies a pre-programmed delay to it to produce a delayed analog MPS audio signal 30. This analog audio can be broadcast as a backup channel for hybrid IBOC DAB broadcasts. The delay compensates for the system delay of the digital MPS audio, allowing receivers to blend between the digital and analog program without a shift in time. In an AM transmission system, the delayed MPS audio signal 30 is converted by the exporter to a mono signal and sent directly to the STL as part of the exciter link data 52.

The EASU 22 accepts MPS audio 42 from the studio automation equipment, rate converts it to the proper system clock, and outputs two copies of the signal, one digital (26) and one analog (28). The EASU includes a GPS receiver that is connected to an antenna 25. The GPS receiver allows the EASU to derive a master clock signal, which is synchronized to the exciter's clock by use of GPS units. The EASU provides the master system clock used by the exporter. The EASU is also used to bypass (or redirect) the analog MPS audio from being passed through the exporter in the event the exporter has a catastrophic fault and is no longer operational. The bypassed audio 32 can be fed directly into the STL transmitter, eliminating a dead-air event.

STL transmitter 48 receives delayed analog MPS audio 50 and exciter link data 52. It outputs exciter link data and delayed analog MPS audio over STL link 14, which may be either unidirectional or bidirectional. The STL link may be a digital microwave or Ethernet link, for example, and may use the standard User Datagram Protocol or the standard TCP/IP.

The transmitter site includes an STL receiver 54, an exciter 56 and an analog exciter 60. The STL receiver 54 receives exciter link data, including audio and data signals as well as command and control messages, over the STL link 14. The exciter link data is passed to the exciter 56, which produces the IBOC DAB waveform. The exciter includes a host processor, digital up-converter, RF up-converter, and exgine subsystem 58. The exgine accepts exciter link data and modulates the digital portion of the IBOC DAB waveform. The digital up-converter of exciter 56 converts from digital-to-analog the baseband portion of the exgine output. The digital-to-analog conversion is based on a GPS clock, common to that of the exporter's GPS-based clock derived from the EASU. Thus, the exciter 56 includes a GPS unit and antenna 57. An alternative method for synchronizing the exporter and exciter clocks can be found in U.S. patent application Ser. No. 11/081,267 (Publication No. 2006/0209941 A1), the disclosure of which is hereby incorporated by reference. The RF up-converter of the exciter up-converts the analog signal to the proper in-band channel frequency. The up-converted signal is then passed to the high power amplifier 62 and antenna 64 for broadcast. In an AM transmission system, the exgine subsystem coherently adds the backup analog MPS audio to the digital waveform in the hybrid mode; thus, the AM transmission system does not include the analog exciter 60. In addition, the exciter 56 produces phase and magnitude information and the analog signal is output directly to the high power amplifier.

IBOC DAB signals can be transmitted in both AM and FM radio bands, using a variety of waveforms. The waveforms include an FM hybrid IBOC DAB waveform, an FM all-digital IBOC DAB waveform, an AM hybrid IBOC DAB waveform, and an AM all-digital IBOC DAB waveform.

Figure 2:
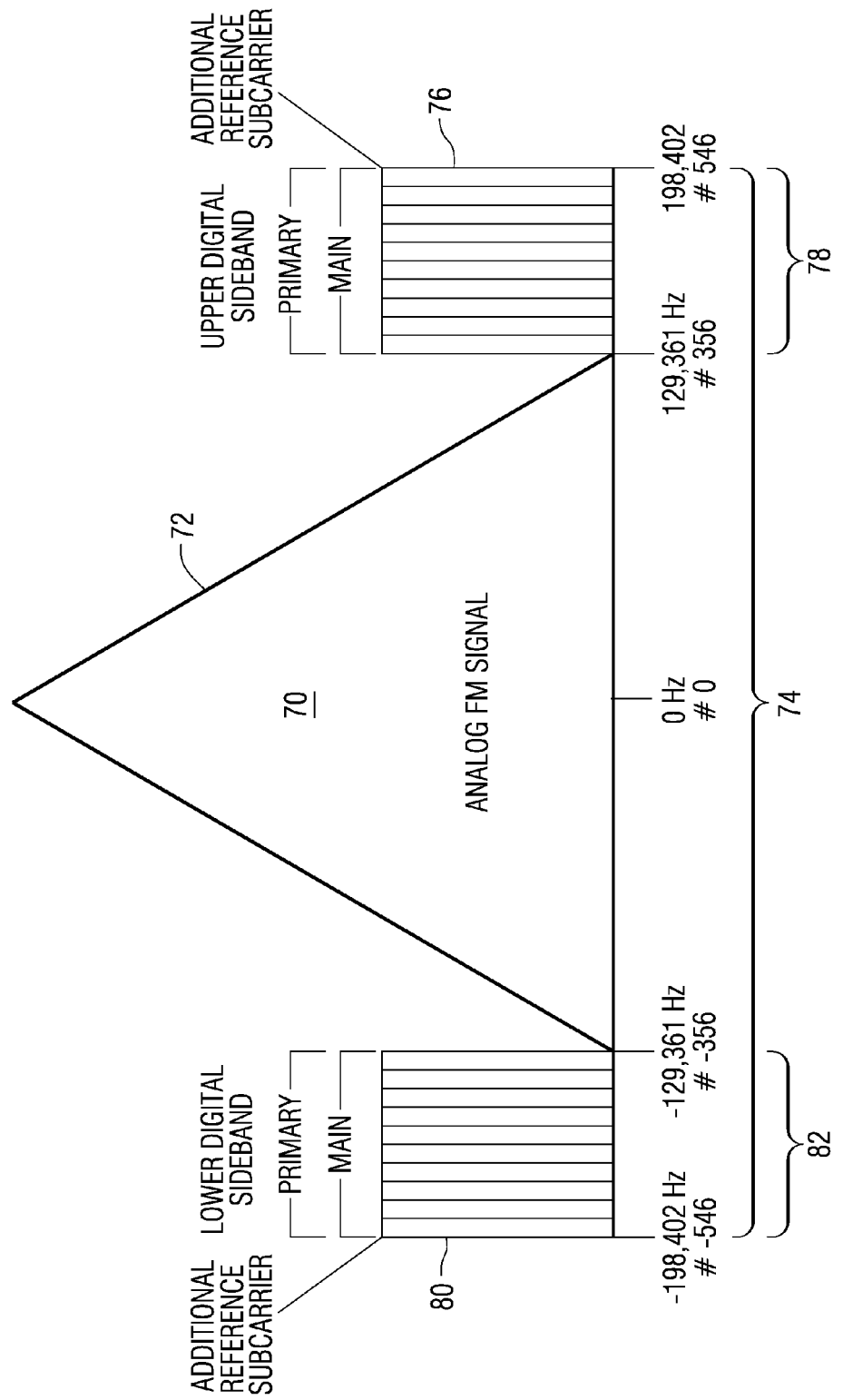
FIG. 2 is a schematic representation of a hybrid FM IBOC waveform.

FIG. 2 is a schematic representation of a hybrid FM IBOC waveform 70. The waveform includes an analog modulated signal 72 located in the center of a broadcast channel 74, a first plurality of evenly spaced orthogonally frequency division multiplexed subcarriers 76 in an upper sideband 78, and a second plurality of evenly spaced orthogonally frequency division multiplexed subcarriers 80 in a lower sideband 82. The digitally modulated subcarriers are divided into partitions and various subcarriers are designated as reference subcarriers. A frequency partition is a group of 19 OFDM subcarriers containing 18 data subcarriers and one reference subcarrier.

The hybrid waveform includes an analog FM-modulated signal, plus digitally modulated primary main subcarriers. The subcarriers are located at evenly spaced frequency locations. The subcarrier locations are numbered from −546 to +546. In the waveform of FIG. 2, the subcarriers are at locations +356 to +546 and −356 to −546. Each primary main sideband is comprised of ten frequency partitions. Subcarriers 546 and −546, also included in the primary main sidebands, are additional reference subcarriers. The amplitude of each subcarrier can be scaled by an amplitude scale factor.

Figure 3:
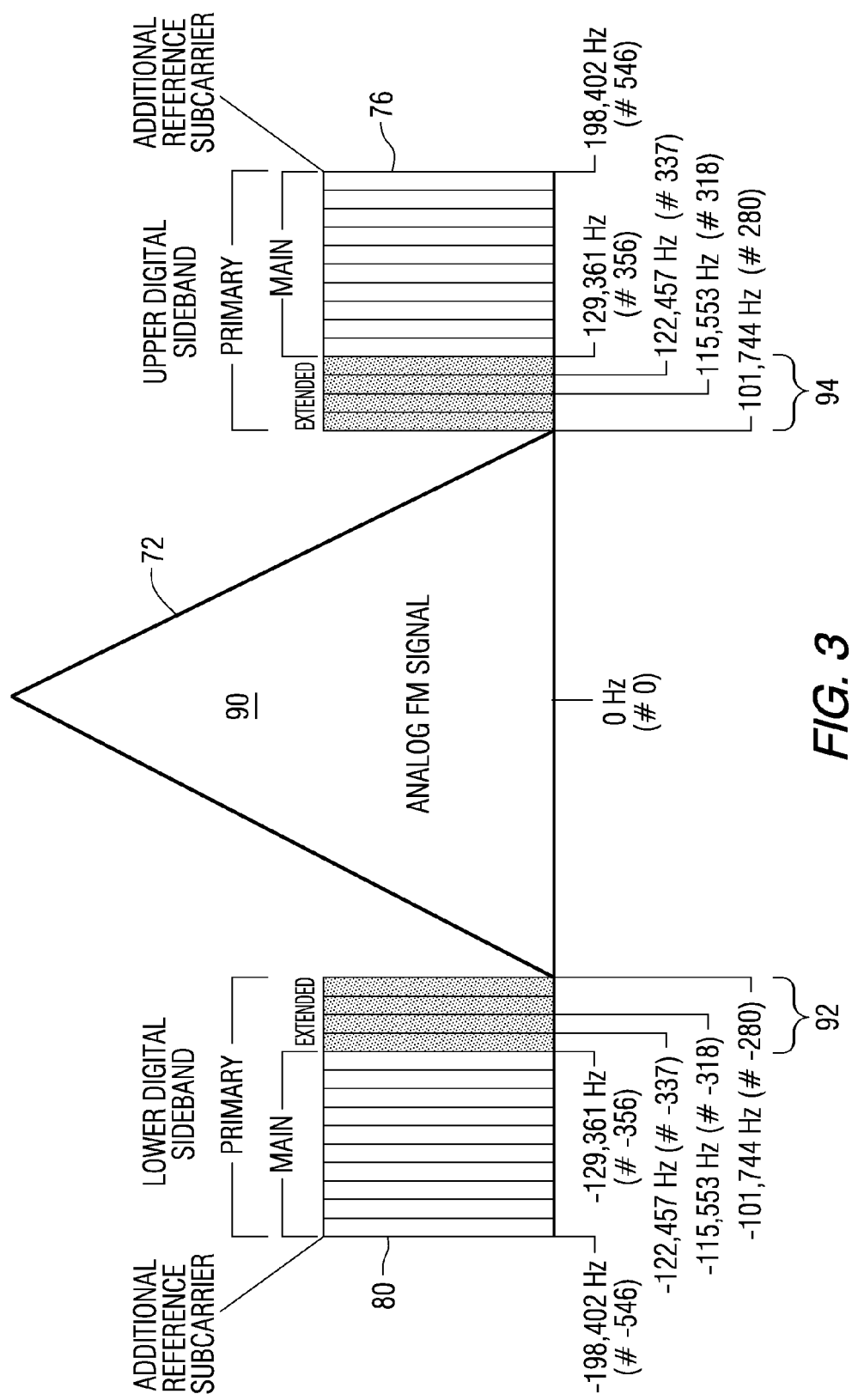
FIG. 3 is a schematic representation of an extended hybrid FM IBOC waveform.

FIG. 3 is a schematic representation of an extended hybrid FM IBOC waveform 90. The extended hybrid waveform is created by adding primary extended sidebands 92, 94 to the primary main sidebands present in the hybrid waveform. One, two, or four frequency partitions can be added to the inner edge of each primary main sideband. The extended hybrid waveform includes the analog FM signal plus digitally modulated primary main subcarriers (subcarriers +356 to +546 and −356 to −546) and some or all primary extended subcarriers (subcarriers +280 to +355 and −280 to −355).

The upper primary extended sidebands include subcarriers 337 through 355 (one frequency partition), 318 through 355 (two frequency partitions), or 280 through 355 (four frequency partitions). The lower primary extended sidebands include subcarriers −337 through −355 (one frequency partition), −318 through −355 (two frequency partitions), or −280 through −355 (four frequency partitions). The amplitude of each subcarrier can be scaled by an amplitude scale factor.

Figure 4:
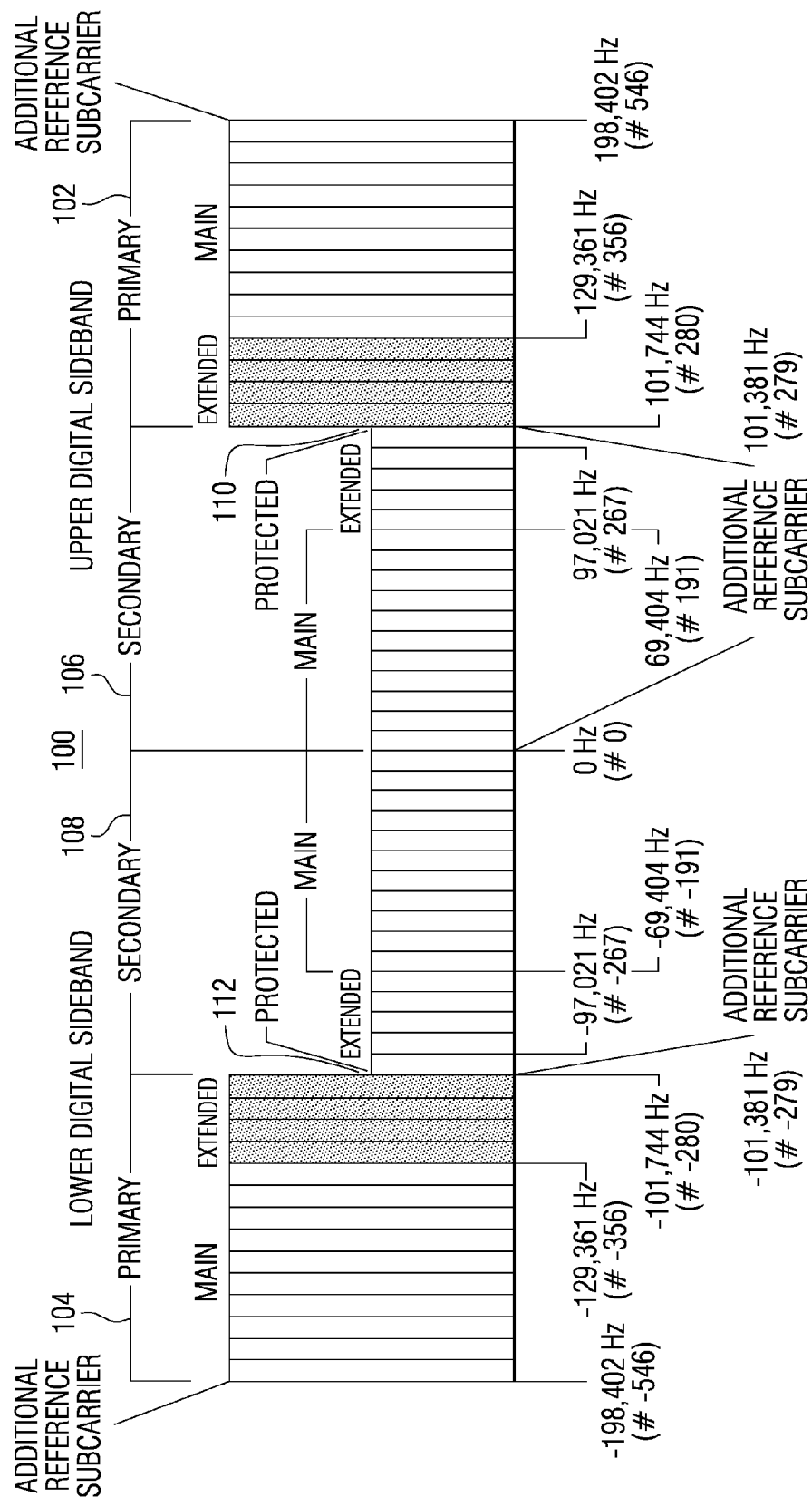
FIG. 4 is a schematic representation of an all-digital FM IBOC waveform.

FIG. 4 is a schematic representation of an all-digital FM IBOC waveform 100. The all-digital waveform is constructed by disabling the analog signal, fully expanding the bandwidth of the primary digital sidebands 102, 104, and adding lower-power secondary sidebands 106, 108 in the spectrum vacated by the analog signal. The all-digital waveform in the illustrated embodiment includes digitally modulated subcarriers at subcarrier locations −546 to +546, without an analog FM signal.

In addition to the ten main frequency partitions, all four extended frequency partitions are present in each primary sideband of the all-digital waveform. Each secondary sideband also has ten secondary main (SM) and four secondary extended (SX) frequency partitions. Unlike the primary sidebands, however, the secondary main frequency partitions are mapped nearer to the channel center with the extended frequency partitions farther from the center.

Each secondary sideband also supports a small secondary protected (SP) region 110, 112 including 12 OFDM subcarriers and reference subcarriers 279 and −279. The sidebands are referred to as "protected" because they are located in the area of spectrum least likely to be affected by analog or digital interference. An additional reference subcarrier is placed at the center of the channel (0). Frequency partition ordering of the SP region does not apply since the SP region does not contain frequency partitions.

Each secondary main sideband spans subcarriers 1 through 190 or −1 through −190. The upper secondary extended sideband includes subcarriers 191 through 266, and the upper secondary protected sideband includes subcarriers 267 through 278, plus additional reference subcarrier 279. The lower secondary extended sideband includes subcarriers −191 through −266, and the lower secondary protected sideband includes subcarriers −267 through −278, plus additional reference subcarrier −279. The total frequency span of the entire all-digital spectrum is 396,803 Hz. The amplitude of each subcarrier can be scaled by an amplitude scale factor. The secondary sideband amplitude scale factors can be user selectable. Any one of the four may be selected for application to the secondary sidebands.

In each of the waveforms, the digital signal is modulated using orthogonal frequency division multiplexing (OFDM). OFDM is a parallel modulation scheme in which the data stream modulates a large number of orthogonal subcarriers, which are transmitted simultaneously. OFDM is inherently flexible, readily allowing the mapping of logical channels to different groups of subcarriers.

In the hybrid waveform, the digital signal is transmitted in primary main (PM) sidebands on either side of the analog FM signal in the hybrid waveform. The power level of each sideband is appreciably below the total power in the analog FM signal. The analog signal may be monophonic or stereo, and may include subsidiary communications authorization (SCA) channels.

In the extended hybrid waveform, the bandwidth of the hybrid sidebands can be extended toward the analog FM signal to increase digital capacity. This additional spectrum, allocated to the inner edge of each primary main sideband, is termed the primary extended (PX) sideband.

In the all-digital waveform, the analog signal is removed and the bandwidth of the primary digital sidebands is fully extended as in the extended hybrid waveform. In addition, this waveform allows lower-power digital secondary sidebands to be transmitted in the spectrum vacated by the analog FM signal.

FIG. 5 is a schematic representation of an AM hybrid IBOC DAB waveform 120. The hybrid format includes the conventional AM analog signal 122 (bandlimited to about ±5 kHz) along with a nearly 30 kHz wide DAB signal 124. The spectrum is contained within a channel 126 having a bandwidth of about 30 kHz. The channel is divided into upper 130 and lower 132 frequency bands. The upper band extends from the center frequency of the channel to about +15 kHz from the center frequency. The lower band extends from the center frequency to about −15 kHz from the center frequency.

The AM hybrid IBOC DAB signal format in one example comprises the analog modulated carrier signal 134 plus OFDM subcarrier locations spanning the upper and lower bands. Coded digital information representative of the audio or data signals to be transmitted (program material), is transmitted on the subcarriers. The symbol rate is less than the subcarrier spacing due to a guard time between symbols.

As shown in FIG. 5, the upper band is divided into a primary section 136, a secondary section 138, and a tertiary section 144. The lower band is divided into a primary section 140, a secondary section 142, and a tertiary section 143. For the purpose of this explanation, the tertiary sections 143 and 144 can be considered to include a plurality of groups of subcarriers labeled 146, 148, 150 and 152 in FIG. 5. Subcarriers within the tertiary sections that are positioned near the center of the channel are referred to as inner subcarriers, and subcarriers within the tertiary sections that are positioned farther from the center of the channel are referred to as outer subcarriers. In this example, the power level of the inner subcarriers in groups 148 and 150 is shown to decrease linearly with frequency spacing from the center frequency. The remaining groups of subcarriers 146 and 152 in the tertiary sections have substantially constant power levels. FIG. 5 also shows two reference subcarriers 154 and 156 for system control, whose levels are fixed at a value that is different from the other sidebands.

The power of subcarriers in the digital sidebands is significantly below the total power in the analog AM signal. The level of each OFDM subcarrier within a given primary or secondary section is fixed at a constant value. Primary or secondary sections may be scaled relative to each other. In addition, status and control information is transmitted on reference subcarriers located on either side of the main carrier. A separate logical channel, such as an IBOC Data Service (IDS) channel can be transmitted in individual subcarriers just above and below the frequency edges of the upper and lower secondary sidebands. The power level of each primary OFDM subcarrier is fixed relative to the unmodulated main analog carrier. However, the power level of the secondary subcarriers, logical channel subcarriers, and tertiary subcarriers is adjustable.

Using the modulation format of FIG. 5, the analog modulated carrier and the digitally modulated subcarriers are transmitted within the channel mask specified for standard AM broadcasting in the United States. The hybrid system uses the analog AM signal for tuning and backup.

FIG. 6 is a schematic representation of the subcarrier assignments for an all-digital AM IBOC DAB waveform. The all-digital AM IBOC DAB signal 160 includes first and second groups 162 and 164 of evenly spaced subcarriers, referred to as the primary subcarriers, that are positioned in upper and lower bands 166 and 168. Third and fourth groups 170 and 172 of subcarriers, referred to as secondary and tertiary subcarriers respectively, are also positioned in upper and lower bands 166 and 168. Two reference subcarriers 174 and 176 of the third group lie closest to the center of the channel. Subcarriers 178 and 180 can be used to transmit program information data.

Figure 7:
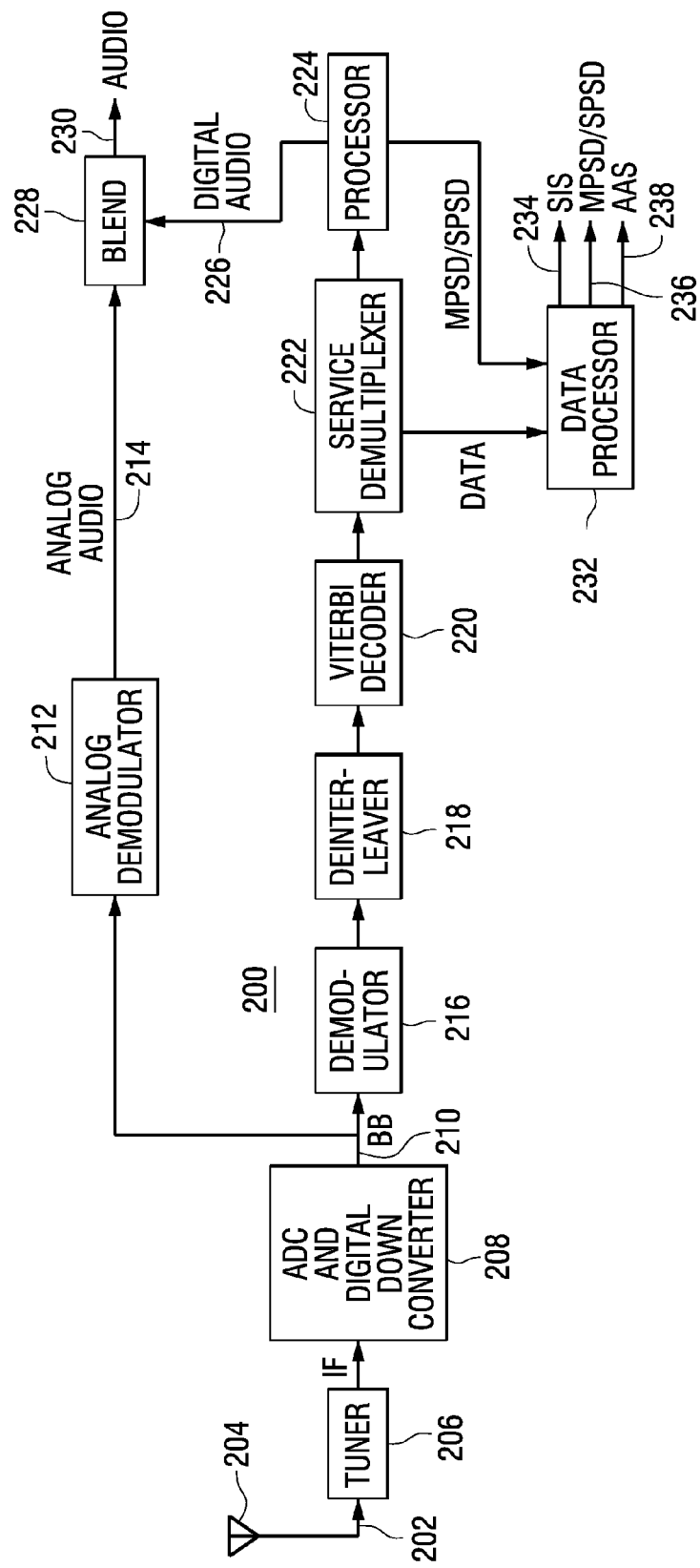
FIG. 7 is a functional block diagram of an AM IBOC DAB receiver.

FIG. 7 is a simplified functional block diagram of an AM IBOC DAB receiver 200. The receiver includes an input 202 connected to an antenna 204, a tuner or front end 206, and a digital down converter 208 for producing a baseband signal on line 210. An analog demodulator 212 demodulates the analog modulated portion of the baseband signal to produce an analog audio signal on line 214. A digital demodulator 216 demodulates the digitally modulated portion of the baseband signal. Then the digital signal is deinterleaved by a deinterleaver 218, and decoded by a Viterbi decoder 220. A service demultiplexer 222 separates main and supplemental program signals from data signals. A processor 224 processes the program signals to produce a digital audio signal on line 226. The analog and main digital audio signals are blended as shown in block 228, or a supplemental digital audio signal is passed through, to produce an audio output on line 230. A data processor 232 processes the data signals and produces data output signals on lines 234, 236 and 238. The data signals can include, for example, a station information service (SIS), main program service data (MPSD), supplemental program service data (SPSD), and one or more auxiliary application services (AAS).

Figure 8:
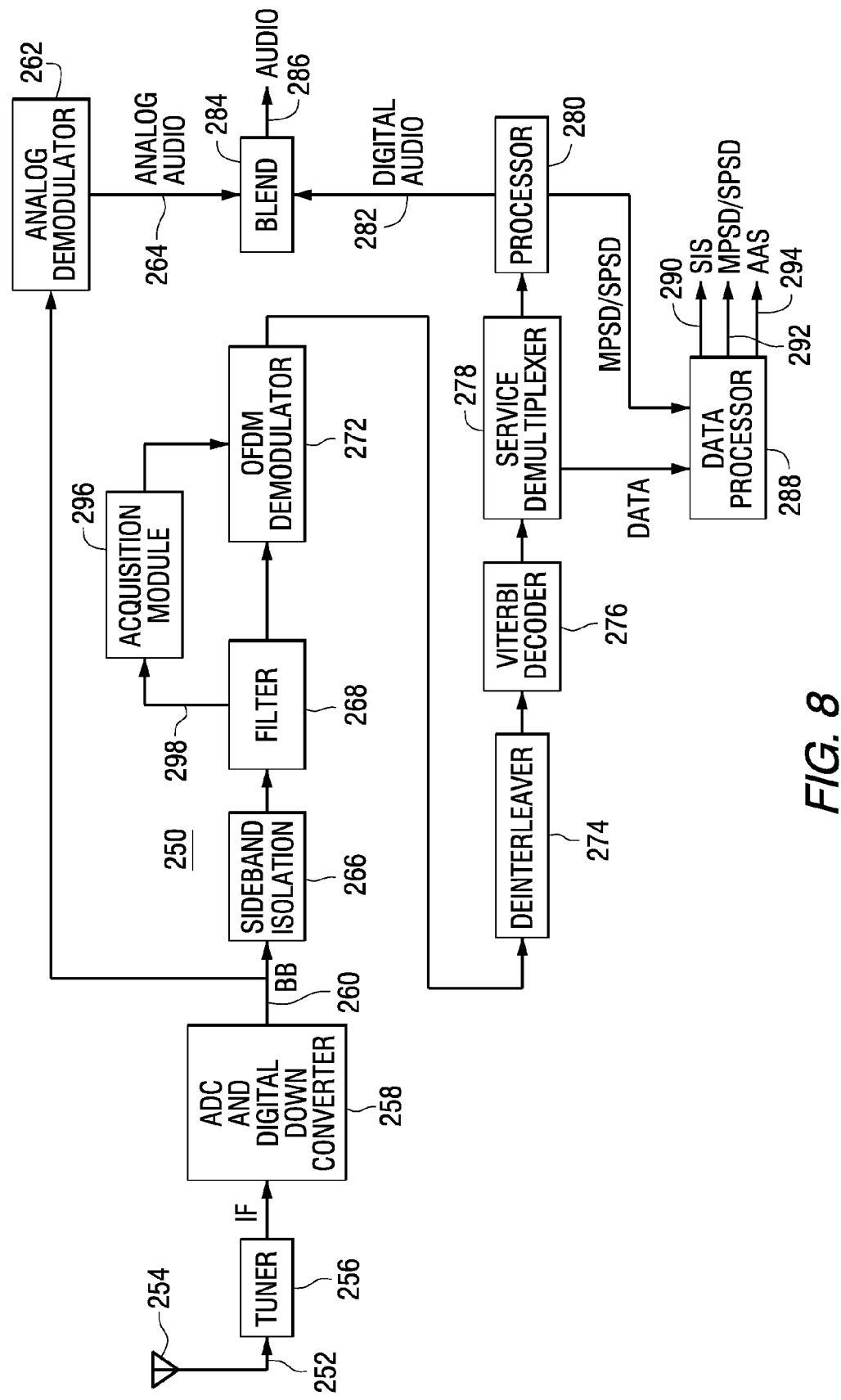
FIG. 8 is a functional block diagram of an FM IBOC DAB receiver.

FIG. 8 is a simplified functional block diagram of an FM IBOC DAB receiver 250. The receiver includes an input 252 connected to an antenna 254 and a tuner or front end 256. A received signal is provided to an analog-to-digital converter and digital down converter 258 to produce a baseband signal at output 260 comprising a series of complex signal samples. The signal samples are complex in that each sample comprises a "real" component and an "imaginary" component, which is sampled in quadrature to the real component. An analog demodulator 262 demodulates the analog modulated portion of the baseband signal to produce an analog audio signal on line 264. The digitally modulated portion of the sampled baseband signal is next filtered by sideband isolation filter 266, which has a pass-band frequency response comprising the collective set of subcarriers $f_1$-$f_n$ present in the received OFDM signal. Filter 268 suppresses the effects of a first-adjacent interferer. Complex signal 298 is routed to the input of acquisition module 296, which acquires or recovers OFDM symbol timing offset or error and carrier frequency offset or error from the received OFDM symbols as represented in received complex signal 298. Acquisition module 296 develops a symbol timing offset $\Delta t$ and carrier frequency offset $\Delta f$, as well as status and control information. The signal is then demodulated (block 272) to demodulate the digitally modulated portion of the baseband signal. Then the digital signal is deinterleaved by a deinterleaver 274, and decoded by a Viterbi decoder 276. A service demultiplexer 278 separates main and supplemental program signals from data signals. A processor 280 processes the main and supplemental program signals to produce a digital audio signal on line 282. The analog and main digital audio signals are blended as shown in block 284, or the supplemental program signal is passed through, to produce an audio output on line 286. A data processor 288 processes the data signals and produces data output signals on lines 290, 292 and 294. The data signals can include, for example, a station information service (SIS), main program service data (MPSD), supplemental program service data (SPSD), and one or more advanced application services (AAS).

In practice, many of the signal processing functions shown in the receivers of FIGS. 7 and 8 can be implemented using one or more integrated circuits.

For test, demonstration, and/or repair purposes, it would be desirable to have a digital radio signal generator that can generator digital radio signals at a test, demonstration, and/or repair location. In one example, the invention provides a signal generator that receives content to be transmitted to one or more receivers. The content can include for example, voice, music, data, etc. A digital representation of the content is used to modulate a plurality of carriers to form an HD Radio™ signal. In-phase and quadrature bits (i.e., a baseband representation of the HD Radio™ waveform) may be stored in a digital storage device such as flash memory device, MMC card, etc.

Signal Generator

Figure 9:
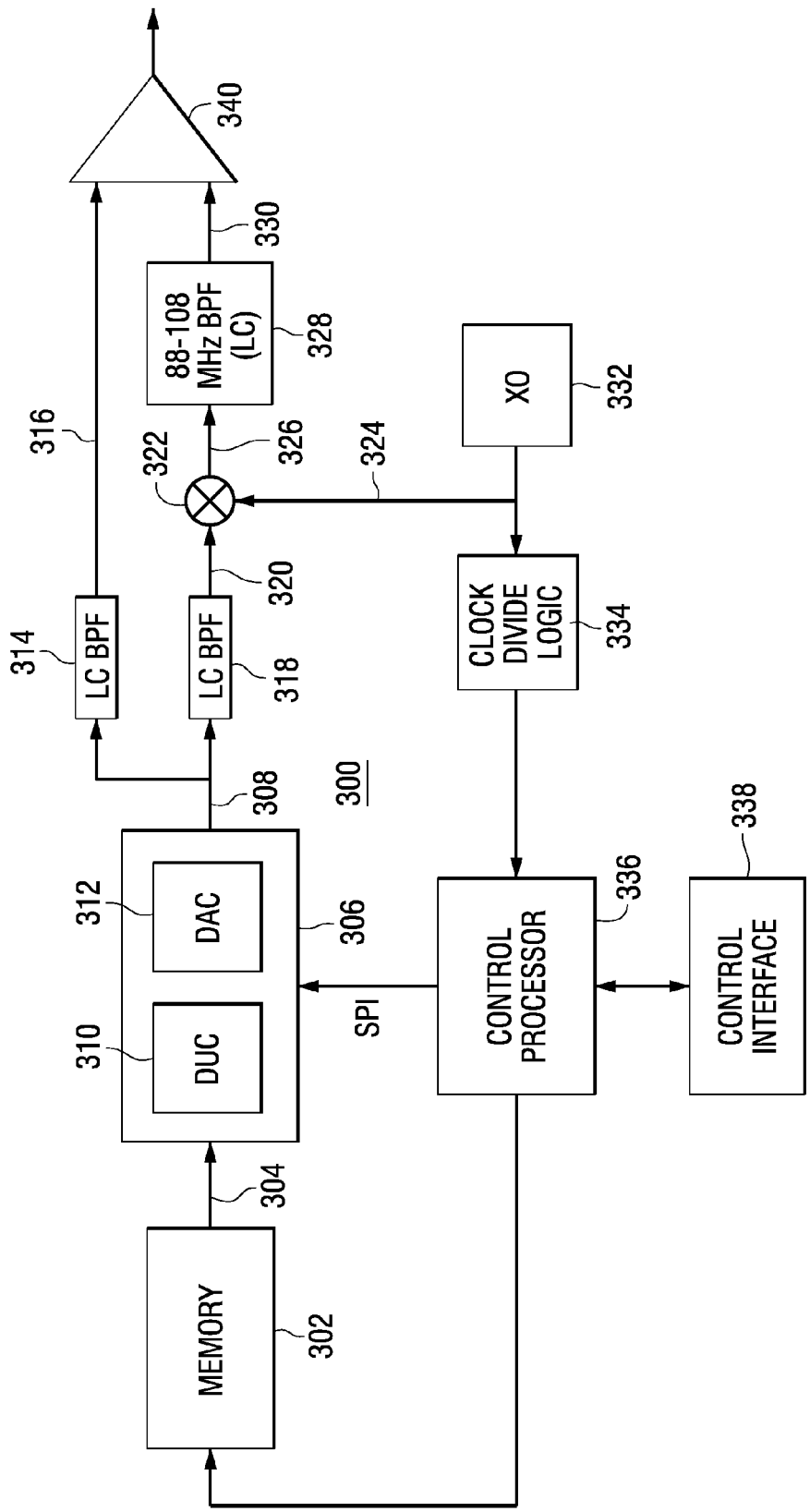
FIGS. 9-13 are block diagrams of apparatus that can be used to implement various aspects of the invention.

FIG. 9 is a block diagram of a signal generator 300 constructed in accordance with an aspect of the invention. The signal generator includes a data storage component 302, which in this example comprises a removable flash memory device. The data storage component can be used to store content in the form of one or more test vectors that provide a digital representation of the information needed to produce an HD Radio™ signal.

The digital output 304 of the data storage device represents in-phase and quadrature bits of information. In one example, the in-phase and quadrature bits of information are elements of an orthogonal frequency division multiplexing waveform. These bits are digitally upconverted to a higher carrier frequency, filtered, and converted to analog in a signal processor 306 to produce an analog signal on line 308. The processor includes a digital up-converter 310 and a digital-to-analog converter 312. The processor converts the vectors to a radio frequency signal on line 308. In this example, the signal on line 308 encompasses frequencies in both the AM band (e.g., about 530 kHz to about 1710 kHz) and includes components that can be upconverted to the FM band (e.g., about 88 MHz to about 108 MHz).

A first bandpass filter 314 filters the analog signal on line 308 to produce an AM HD Radio™ signal on line 316. A second bandpass filter 318 filters the analog signal on line 308 to produce an intermediate radio frequency signal on line 320. The intermediate radio frequency signal on line 320 is mixed in a mixer 322 with a reference radio frequency signal on line 324 to produce an FM RF signal in the FM band (e.g., about 88 MHz to about 108 MHz) on line 326. The FM RF signal is filtered by a third bandpass filter 328 to produce an FM HD Radio™ signal on line 330.

The reference radio frequency signal is produced by an oscillator or clock 332. The reference radio frequency signal is divided by divider 334 and sent to a control processor 336. The control processor is coupled to the signal processor 306 by a bus, and is also used to synchronize the readout of the data storage device 304. A control interface 338 is used to select channels of the analog signal 308. An optional amplifier 340 can be included to amplify the AM and FM HD Radio™ signals.

The signal generator of FIG. 9 can be used to transmit either AM or FM HD Radio™ signals, or both. For the AM signal, the signal on line 308 can have a frequency in the AM band. For the FM signal, the frequency of the signal on line 308 is increased using the mixer. The control processor provides clocking/timing information to the Flash Memory 302. It also provides sample rate information to the processor 306, frequency output control to the processor 306, memory addressing, a read strobe, and initialization of the processor.

Figure 10:
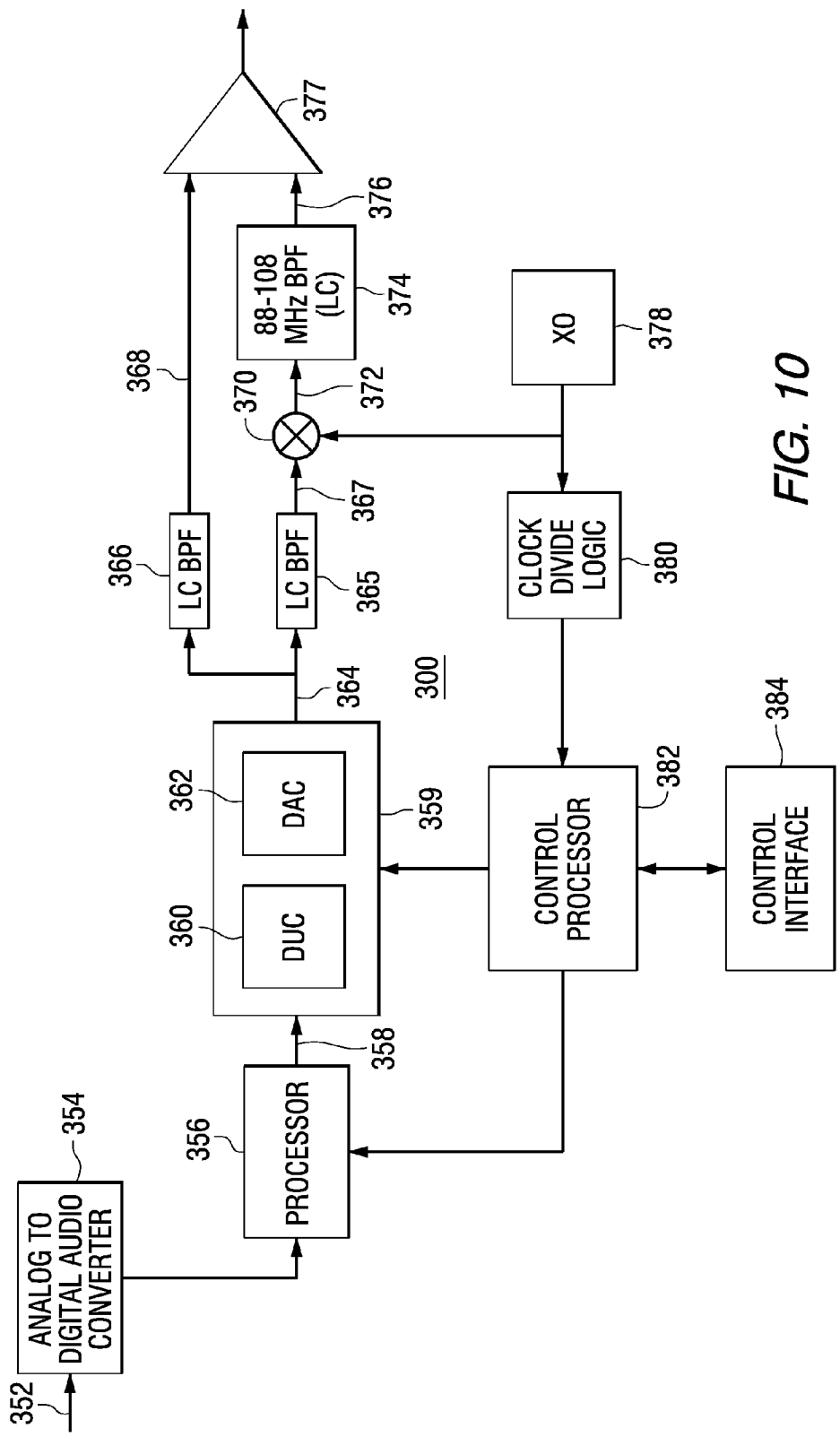

FIG. 10 is a block diagram of a signal generator 350 constructed in accordance with another aspect of the invention. In the example of FIG. 10, an analog signal is received on input 352 and converted to a digital signal by an analog-to-digital converter 354. The analog signal can include content to be transmitted, for example voice, and music. The digital signal is processed by a first processor 356 to produce a signal on line 358. In this example, the processor can include an HD Radio™ codec (HDC) and a real time modulator. The signal on line 358 is similar to the signal on line 304 of FIG. 9.

The signal on line 358 is up-converted by a second processor 359 including a digital up-converter 360 and converted to an analog signal by a digital-to-analog converter 362. The resulting radio frequency signal on line 364 is filtered by a lowpass filter 366 to produce an AM HD Radio™ output signal on line 368. The signal on line 364 is also filtered by a lowpass filter 365 to produce a filtered signal on line 367 that is mixed with a reference signal in mixer 370 to produce an FM signal on line 372. The signal on line 372 is filtered by a bandpass filter 374 to produce an FM HD Radio™ output signal on line 376. An optional amplifier 377 can be included to amplify the AM and FM HD Radio™ signals.

The reference radio frequency signal is produced by an oscillator or clock 378. The reference radio frequency signal is divided by divider 380 and sent to a control processor 382. The control processor is coupled to the signal processor 359 by a bus, and is also used to synchronize the readout of the processor 356. A control interface 384 is used to select channels of the analog signal 364.

Figure 11:
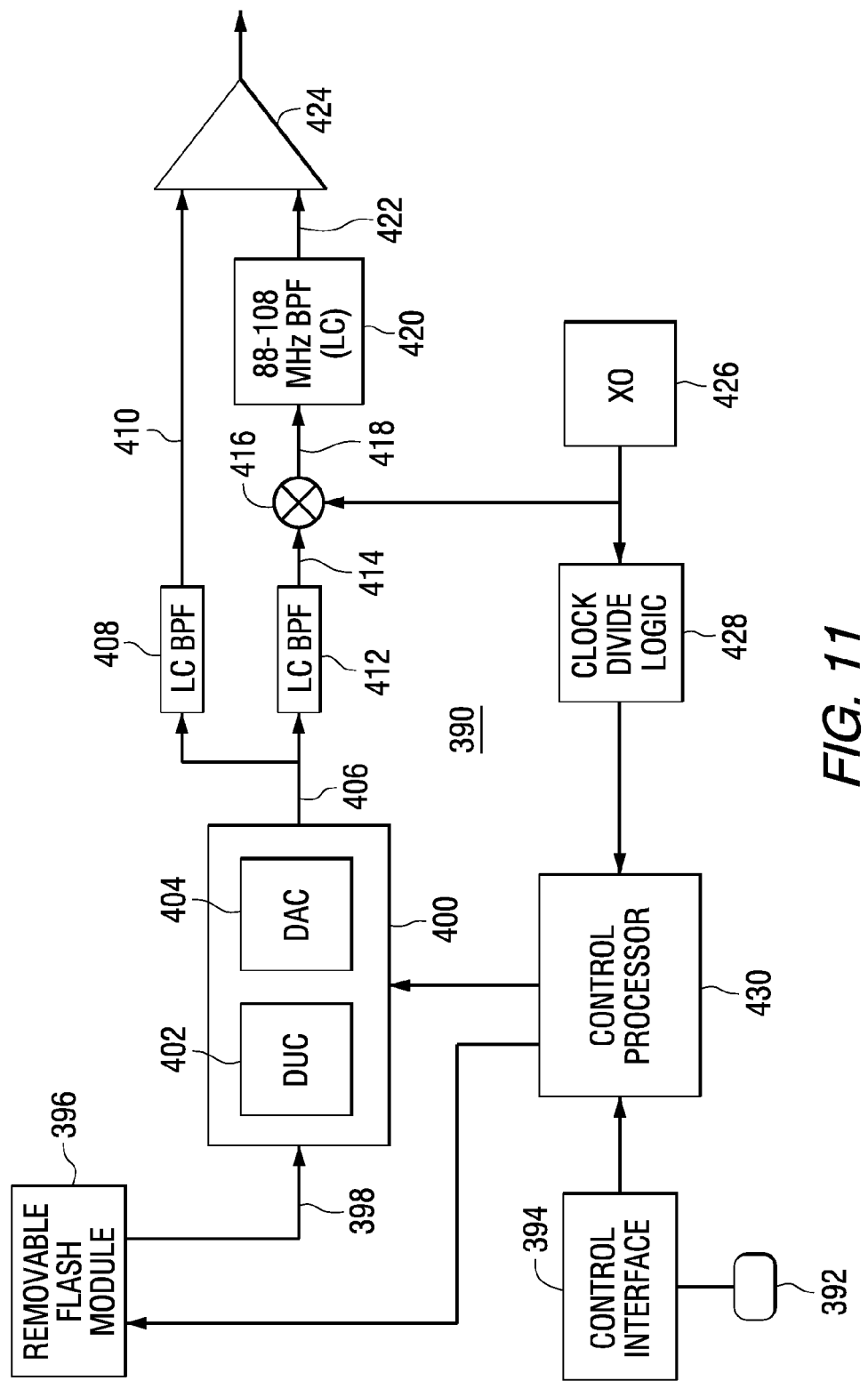

FIG. 11 is a block diagram of a signal generator 390 constructed in accordance with another aspect of the invention. In this example, a user can interact with the signal generator using a graphical user interface 392 that can be coupled to the signal generator through a control interface 394. This enables the user to interact with a data storage device 396, which can be a removable flash memory module, MMC card, etc. The memory could also be a SDRAM and a controller could be used to dynamically control test vectors. For example, the SDRAM may store multiple test vectors and a controller could address the SDRAM to select particular test vectors to be output.

The signal on line 398 is up-converted by a second processor 400 including a digital up-converter 402 and converted to an analog signal by a digital-to-analog converter 404. The resulting radio frequency signal on line 406 is filtered by a lowpass filter 408 to produce an AM HD Radio™ output signal on line 410. The signal on line 406 is also filtered by a lowpass filter 412 to produce a filtered signal on line 414 that is mixed with a reference signal in mixer 416 to produce an FM signal on line 418. The signal on line 418 is filtered by a bandpass filter 420 to produce an FM HD Radio™ output signal on line 422. An optional amplifier 424 can be included to amplify the AM and FM HD Radio™ signals.

The reference radio frequency signal is produced by an oscillator or clock 426. The reference radio frequency signal is divided by divider 428 and sent to a control processor 430. The control processor is coupled to the signal processor 400 by a bus, and is also used to synchronize the readout of the removable flash module 396. A control interface 394 is used to select channels of the analog signal 406.

Figure 12:
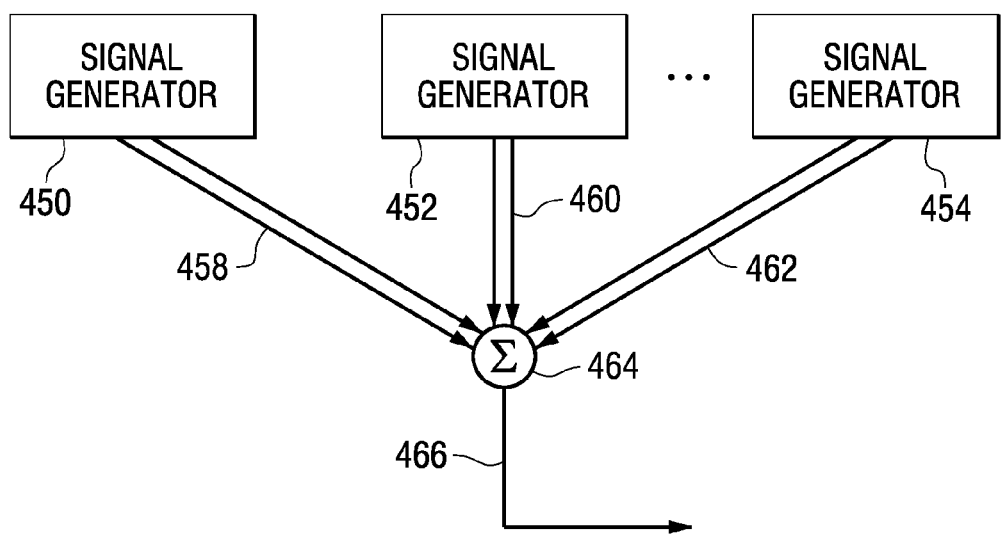

FIG. 12 is a block diagram of a direct digital signal generator constructed in accordance with another aspect of the invention. A plurality of signal generators (in this example, three) 450, 452 and 454 produce outputs 458, 460 and 462 that are combined in a combiner 464 to produce a combined signal on line 466. Each of the channels could be mounted on a removable card to allow for expansion of the outputs.

Figure 13:
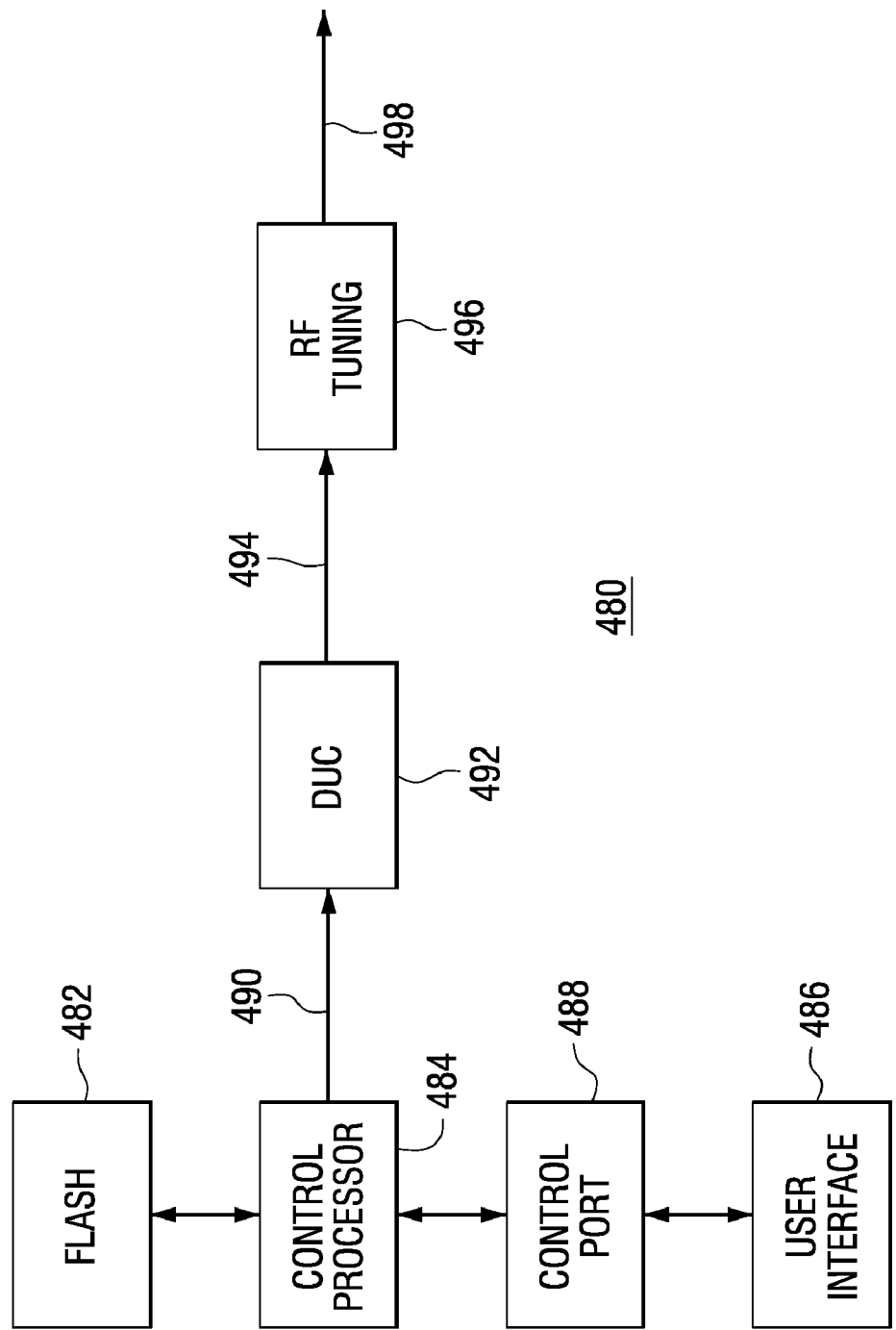
Figure 14:
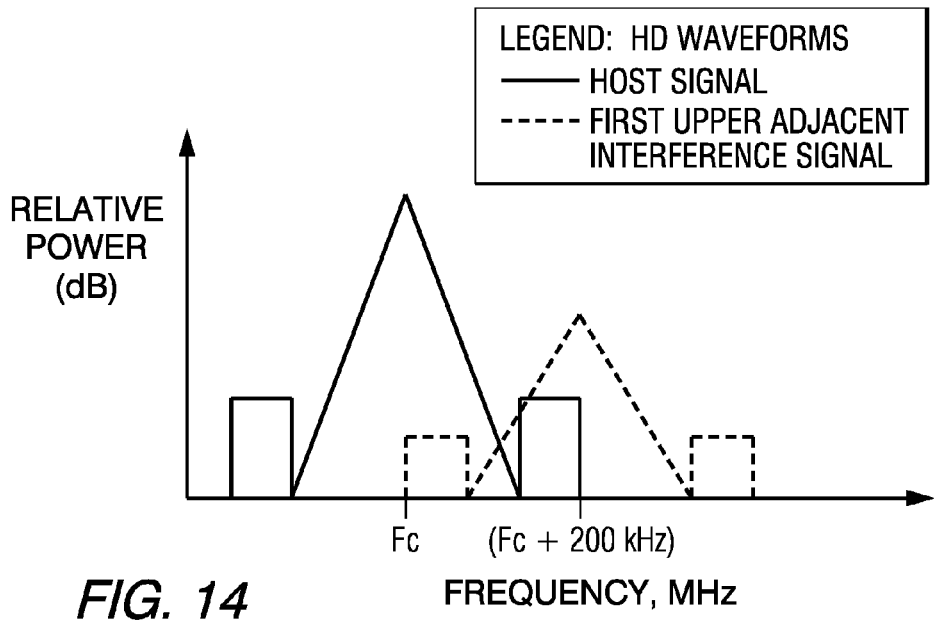
FIGS. 14-18 are waveform diagrams.
Figure 15:
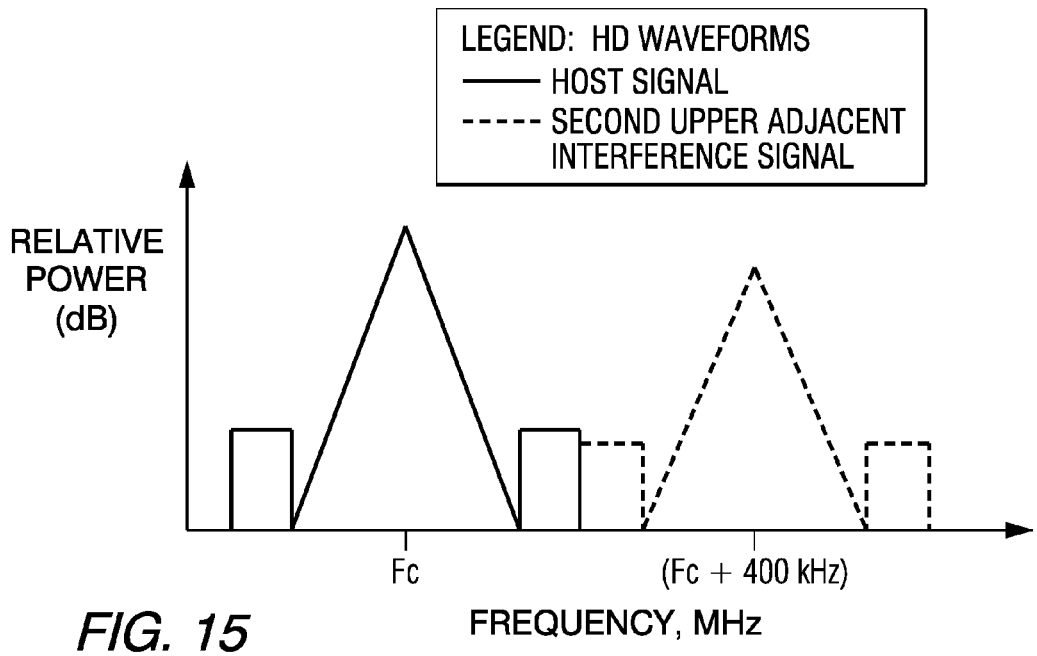
Figure 16:
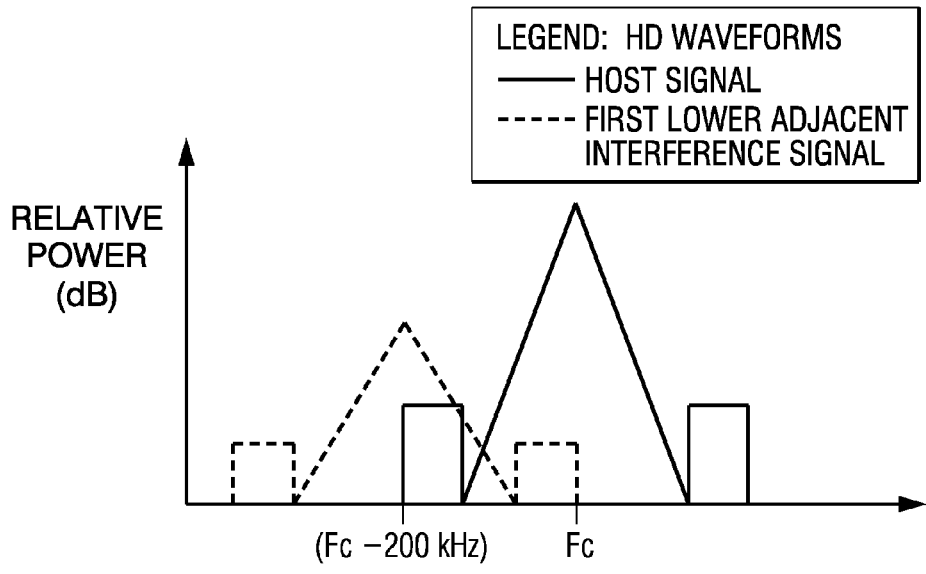
Figure 17:
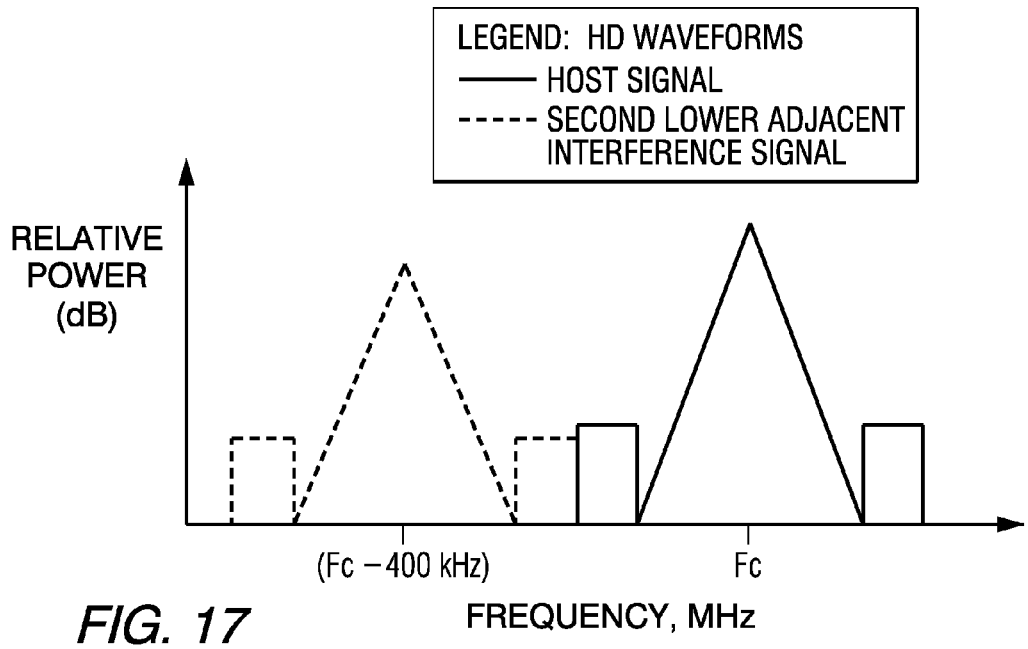
Figure 18:
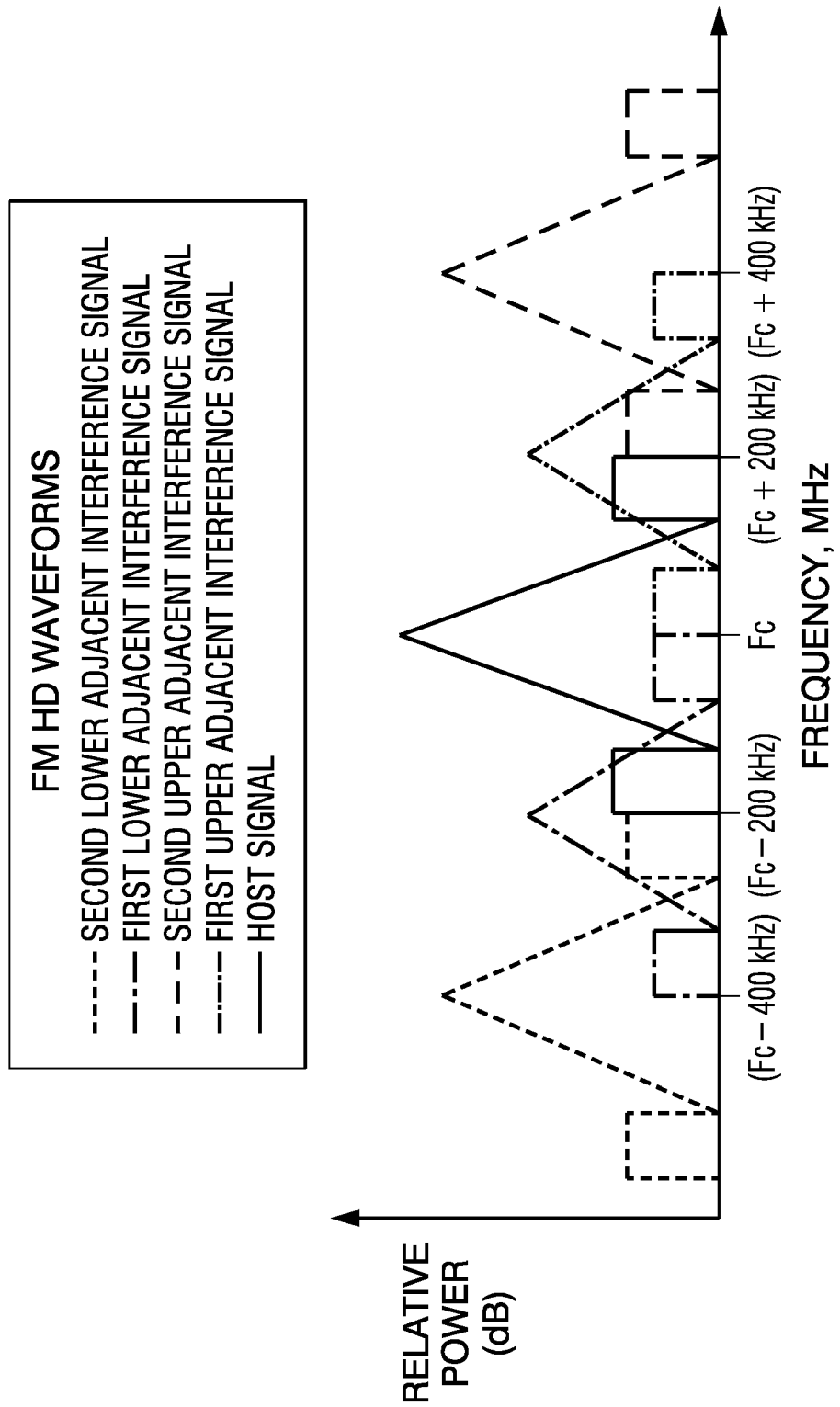

FIG. 13 is a block diagram of a direct digital signal generator 480 constructed in accordance with another aspect of the invention. In this example, the data storage device 482, which can be a flash memory, is used to store a digital representation of the content that is used to modulate a plurality of carriers to form an HD Radio™ signal. The digital representation of the content can include in-phase and quadrature bit information, which is a baseband representation of an HD Radio™ waveform.

This information is read by a control processor, which can be implemented as a field programmable gate array 484. A user can program the control processor using a user interface 486, which can be connected to the control processor through a control port 488. The control processor performs the functions performed by the processors in FIG. 11, and produces an intermediate frequency signal on line 490. That signal is directly up-converted by an up-converter 492 from baseband to RF on line 494, and tuned 496 to produce an HD Radio™ signal in the FM band on line 498.

The signal generators of this invention can be used in a retail demonstration context, wherein a signal generator may be used to supply test signals to one or more HD Radio™ receivers for demonstration purposes at a sales location. Inputs on the receivers could be hardwired to the signal generator output, or the signal generator could be used to transmit test signals to receiver antennas. The memory component of the signal generator can be removable. This would allow easy substitution of a different memory component by untrained personnel. In addition, a removable memory could be updated and easily returned to the signal generator. As used herein, the term removable means that the component can be removed from the signal generator without requiring disassembly of the signal generator, and without the need for tools. For example, the memory component could be a flash drive that connects to the signal generator through a control port.

In addition to a retail demonstration application, the signal generators of this invention could be used in other environments, such as in automotive test equipment, radio production line test equipment, in emergency information transmitters, or in talking house applications to transmit real estate information, that can include data and pictures, to receivers that are within range of the signal generator output.

In one embodiment, the signal generator can be a portable, battery powered device that can be easily transported to a location of interest. For example, in an automotive test environment, a portable signal generator could be used to provide a test signal to a vehicle mounted radio receiver.

In one aspect of the invention, the test vectors provided by the memory component can be used to provide content for a HD Radio™ signal that is transmitted to one or more radio receivers for test or demonstration purposes.

Test Vectors

The test vectors represent analog and HD Radio™ source signals and may also include the many factors commonly found in harsh radio frequency (RF) environments. These factors include noise, fading, and adjacent channel interference. When these factors are encoded in the test vector, their influence on the received signal can be evaluated. The test vectors can be used to certify HD Radio™ test equipment and HD Radio™ receivers. Test vectors can also be used to support receiver development and production testing.

The test vectors include complex integer samples of the baseband (or low IF) analog and HD Radio™ waveforms. The size of the integer sample should match the size of the number of bits in the signal processor DAC and the sample rate must be greater than the bandwidth of the signal.

In various aspects of the invention, the vectors can represent a signal of interest and an interfering signal. The interfering signal can represent, for example, a first adjacent interferer. In another aspect, the power ratio of the signal of interest and the interfering signal is adjustable. FIGS. 14-18 show various waveforms that can be produced by the signal generator for several FM IBOC scenarios. In addition, the vectors can represent an integral number of transfer frames in a broadcast signal.

The implementations described above and other implementations are within the scope of the following claims.

What is claimed is:

1. A signal generator comprising:
   a memory for storing content information in the form of vectors including in-phase and quadrature elements of a digital representation of the content that is used to modulate an orthogonal frequency division multiplexing waveform;
   a signal processor for converting the stored vectors to a first radio frequency signal;
   a first filter for extracting an AM in-band on-channel signal from the first radio frequency signal;
   a mixer for mixing the first radio frequency signal with a reference signal to produce a second radio frequency signal;
   a second filter for extracting an FM in-band on-channel signal from the second radio frequency signal; and
   a control processor for controlling the operation of the memory and the signal processor, wherein the in-phase and quadrature elements represent baseband content of the first radio frequency signal.

2. The signal generator of claim 1, wherein the FM in-band on-channel signal comprises an analog modulated carrier and a plurality of digitally modulated subcarriers.

3. The signal generator of claim 2, wherein the AM in-band on-channel signal comprises an analog modulated carrier and a plurality of digitally modulated subcarriers.

4. The signal generator of claim 1, wherein the memory is removable.

5. The signal generator of claim 1, wherein the memory is updatable through a data port.

6. The signal generator of claim 1, further comprising:
   a battery for powering the signal processor and control processor.

7. A signal generator comprising:
   a memory for storing content information in the form of vectors including in-phase and quadrature elements of a digital representation of content that is used to modulate an orthogonal frequency division multiplexing waveform;
   a signal processor for converting the stored vectors to a first radio frequency signal;
   a filter for extracting an AM in-band on-channel signal from the first radio frequency signal;
   a mixer for mixing the first radio frequency signal with a reference signal to produce a second radio frequency signal;
   a filter for extracting an FM in-band on-channel signal from the second radio frequency signal; and
   a control processor for controlling the operation of the memory and the signal processor, wherein the vectors represent a signal of interest and are encoded to include one or more of noise, fading, and an interfering signal, and wherein the in-phase and quadrature elements represent baseband content of the first radio frequency signal.

8. The signal generator of claim 7, wherein the power ratio of the signal of interest and the interfering signal is adjustable.

9. The signal generator of claim 7, wherein the interfering signal represents a first adjacent interferer.

10. The signal generator of claim 1, wherein the vectors represent an integral number of transfer frames in a broadcast signal.

11. The signal generator of claim 1, further comprising:
    a user interface for controlling the control processor.

12. A method of demonstrating or testing the operation of a radio receiver, the method comprising the steps of:
    using a portable signal generator to produce a first radio frequency signal,
    wherein the portable signal generator includes a memory containing vectors including in-phase and quadrature elements used to produce the first radio frequency signal,
    a filter for extracting an AM in-band on-channel signal from the first radio frequency signal, a mixer for mixing the first radio frequency signal with a reference signal to produce a second radio frequency signal, and a filter for extracting an FM inband on-channel signal from the second radio frequency signal, and wherein the vectors represent a signal of interest and are encoded to include one or more of noise, fading, and an interfering signal, and wherein the in-phase and quadrature elements represent baseband content of the radio frequency signal;

transmitting the AM in-band on-channel signal and the FM in-band on-channel signal to a radio receiver; and using the radio receiver to produce an output in response to the AM in-band on-channel signal or the FM in-band on-channel signal.

13. The method of claim 12, wherein the power ratio of the signal of interest and the interfering signal is adjustable.

14. The method of claim 12, wherein the interfering signal represents a first adjacent interferer.

15. The method of claim 12, wherein the vectors represent an integral number of transfer frames in a broadcast signal.

16. A signal generator comprising:
an input for receiving analog content information;
an analog-to-digital converter for converting the analog content information to digital content information;
a first processor for converting the digital content information to a plurality of vectors including in-phase and quadrature elements;
a second processor for processing the vectors to produce a first radio frequency signal;
a filter for extracting an AM in-band on-channel signal from the first radio frequency signal;
a mixer for mixing the first radio frequency signal with a reference signal to produce a second radio frequency signal; and
a filter for extracting an FM in-band on-channel signal from the second radio frequency signal, wherein the in-phase and quadrature elements represent baseband content of the first and second radio frequency signals.

17. The signal generator of claim 16, wherein the FM in-band on-channel signal comprises an analog modulated carrier and a plurality of digitally modulated subcarriers.

18. The signal generator of claim 17, wherein the AM in-band on-channel signal comprises an analog modulated carrier and a plurality of digitally modulated subcarriers.

19. The signal generator of claim 16, wherein the vectors represent a signal of interest and an interfering signal.

20. The signal generator of claim 19, wherein the power ratio of the signal of interest and the interfering signal is adjustable.

21. The signal generator of claim 19, wherein the interfering signal represents a first adjacent interferer.

22. The signal generator of claim 16, wherein the vectors represent an integral number of transfer frames in a broadcast signal.

* * * * *